US008781885B2

(12) United States Patent
Johnson

(10) Patent No.: US 8,781,885 B2
(45) Date of Patent: Jul. 15, 2014

(54) METHOD FOR COMPLIANCE OF STANDARDS REGISTRAR WITH ACCREDITATION REQUIREMENTS

(75) Inventor: Perry L. Johnson, Bloomfield Hills, MI (US)

(73) Assignee: Perry L. Johnson Registrars of Texas, L.P., Dallas, TX (US)

( * ) Notice: Subject to any disclaimer, the term of this patent is extended or adjusted under 35 U.S.C. 154(b) by 3247 days.

(21) Appl. No.: 10/500,179

(22) PCT Filed: Dec. 31, 2001

(86) PCT No.: PCT/US01/50027
§ 371 (c)(1),
(2), (4) Date: Dec. 8, 2004

(87) PCT Pub. No.: WO03/058523
PCT Pub. Date: Jul. 17, 2003

(65) Prior Publication Data
US 2005/0091067 A1 Apr. 28, 2005

(51) Int. Cl.
*G06Q 10/00* (2012.01)
(52) U.S. Cl.
USPC ........ 705/7.41; 705/7.38; 705/7.39; 705/26.4
(58) Field of Classification Search
USPC ....................................................... 705/7.41
See application file for complete search history.

(56) References Cited

U.S. PATENT DOCUMENTS

| | | | | |
|---|---|---|---|---|
| 5,592,375 A | * | 1/1997 | Salmon et al. ................. | 705/321 |
| 5,765,138 A | * | 6/1998 | Aycock et al. ................ | 705/7.23 |
| 5,918,219 A | * | 6/1999 | Isherwood ....................... | 705/37 |
| 6,049,776 A | * | 4/2000 | Donnelly et al. ............. | 705/7.14 |
| 6,154,753 A | * | 11/2000 | McFarland .................... | 715/221 |
| 6,343,275 B1 | * | 1/2002 | Wong ............................ | 705/26.1 |
| 6,385,621 B1 | * | 5/2002 | Frisina .......................... | 707/792 |
| 6,647,373 B1 | * | 11/2003 | Carlton-Foss ................. | 705/37 |
| 7,305,367 B1 | * | 12/2007 | Hollis et al. .................. | 705/400 |
| 7,610,233 B1 | * | 10/2009 | Leong et al. .................... | 705/37 |
| 8,396,811 B1 | * | 3/2013 | Hahn-Carlson ................ | 705/75 |
| 2001/0051913 A1 | * | 12/2001 | Vashistha et al. ............... | 705/37 |
| 2002/0010614 A1 | * | 1/2002 | Arrowood .......................... | 705/9 |
| 2002/0138377 A1 | * | 9/2002 | Weber .............................. | 705/32 |

OTHER PUBLICATIONS

Periphonics Introduces CallSentry, a Call Center Monitoring Tool for Recording and Storage of Agent Conversations Business Editors. Business Wire. New York: Sep. 23, 1998. p. 1.*

(Continued)

*Primary Examiner* — Beth V Boswell
*Assistant Examiner* — Alan S Miller
(74) *Attorney, Agent, or Firm* — Brooks Kushman P.C.

(57) ABSTRACT

A methodology for standards registrars to meet requirements of governmental accrediting agencies includes a unique set of procedures and work instructions for certifying or registering an organization as conforming to one or more national or international standards. The procedures and work instructions assure adherence to the international guidance document government registrars, while providing easily used and maintained instructions for employees. The procedures and work instructions are amenable to translation into various foreign languages. In one embodiment, the methodology includes procedures and work instructions governing the quotation process and scheduling of audits, including selection of auditors, as well as audit package review and issuance of appropriate certificates of compliance are. The procedures and work instructions for all audits and certifications are preferably controlled (150) and directly auditable via a single location or office, such as the registrar's headquarters.

5 Claims, 3 Drawing Sheets

(56) References Cited

OTHER PUBLICATIONS

Auditor selection and audit committee characteristics Lawrence J Abbott, Susan Parker. Auditing. Sarasota: Fall 2000. vol. 19, Iss. 2; p. 47, 21 pgs.*

ISO 9000 series quality standards Ridley, Jeffrey. Business Credit. New York: Jan. 1997. vol. 99, Iss. 1; p. 52, 3 pgs.*

ISO/IEC Guide 62:1996 General requirements for bodies operating assessment and certification/registration of quality systems, 1996 (www.isostandards.com.au).*

IAF Guidance on the Application of ISO/IEC Guide 62:1996 General Requirements for Bodies Operating Assessment and Certification/registration of Quality.*

Necessary Activities connected with assessment and surveillance according to ISO/IEC Guide 62 and EAC/G3 (http://elsmar.com/pdf_files/ISO_Audit_Mandays.pdf).*

* cited by examiner

METHOD FOR COMPLIANCE OF STANDARDS REGISTRAR WITH ACCREDITATION REQUIREMENTS

BACKGROUND OF THE INVENTION

1. Field of the Invention

The present invention relates to a methodology that enables a standards registrar to meet accreditation requirements of governmental or quasi-governmental agencies.

2. Background

The fierce competition of the 1980s taught American business and industry an unforgettable lesson: Firms that do not provide quality products and services do not thrive, and may not survive. In the 1990s, and on into the 21st century, the definition of quality broadened beyond the caliber of the product or service itself. This extension includes every aspect of providing a product or service, from selling through delivery, to billing and after-sale service.

When choosing suppliers for materials, parts or services, customers at every level, whether industrial, wholesale or retail, need and want a guarantee that they will receive all-around quality. That demand can be met through a comprehensive approach to quality management. As such various national and international organizations have developed series of standards which apply to quality, environmental, occupational health and safety, and other management systems. For example, international and national standards such as ISO 9001:2000, ISO 9001/9002:1994, QS-9000, ISO/TS 16949, VDA 6.1, TL 9000, ISO 13485, the Tooling and Equipment (TE) Supplement, the Semiconductor Supplement, ISO 14001, AS9100, ISO/IEC 17025 and OHSAS 18001, have been developed to provide a measure and method for quality management in various industrial and commercial concerns. A standards registrar provides a third-party certification that a particular organization conforms to one or more of such national and/or international standards. As such, standards registrars typically must be recognized or accredited by various national and/or international governmental or quasi-governmental agencies as also possessing a level of competence that the registrar's certification may be relied upon. Examples of such governmental or quasi-governmental agencies include the Registrar Accreditation Board (RAB) in the United States, the RvA of the Netherlands, the UKAS of Great britain, TGA of Germany, JAB of Japan, and INMETRO of Brazil. As more and more countries and industries recognize the importance of quality standards, the need for certification and registration continues to increase with an associated increase of standards registrars and national and international accrediting bodies.

The word "quality" itself is the cause of much confusion. Quality is defined by the international standards organization (ISO) in ISO 9000:2000, 3.1.1 as the "degree to which a set of inherent characteristics fulfills requirements" and by ISO 8402:1994, 2.1 as the "totality of characteristics of an entity that bear on its ability to satisfy stated and implied needs." Achieving a satisfactory level of quality involves all activities having an influence on quality.

For the purposes of attaining customer satisfaction, quality means fitness for purpose or fitness of use. Simply stated, it is the ability to meet a given need. Whether the quality of a product or a service is appropriate, depends on the need(s) it is meant to fulfill. For example, the fitting of bathroom floor tiles for the restrooms in a local shopping mall would be determined by quite different standards from tiles meant for the bathroom of a private home. Likewise, a cleaning service used by a laboratory will need to meet different standards from one used by an insurance office. As such, before quality can be determined or judged, it is necessary to understand the measure, which is generally based on the customer's requirements. These requirements are not limited simply to the product or service, however. They encompass all other aspects of the transaction, including price, delivery and its timing, and after-sale service.

The history of quality can be traced as far back as the days of the caveman. A self-sufficient caveman was both a supplier and user. In order to be both, he had to know exactly what was needed, fulfilling the customer requirement, and then became a supplier by creating or manufacturing that item. This common-sense methodology has been passed down through the generations of mankind and is still in practice today. The same concepts can be applied to internal suppliers and customers. Internally, quality also means timely delivery of the product or service required to meet a defined need. The correct and properly made rough castings, for example, must be delivered in the right number to the matching area when they are needed. The company's mail must be correctly sorted and delivered according to schedule, etc.

The chief goal of many businesses is to make a profit for the owner, whether an individual, a partnership or several thousand stockholders, through selling goods or services. Over time, businesses have employed many different strategies to improve their prospects of making a profit. Quality management provides important benefits for customers, but it is even more valuable to the firm. With quality management, companies can improve revenues and cut costs. Superior quality helps companies compete more successfully for new customers. It is also critical in retaining current customers. It is well known that it costs much more—estimates range from 5 to 20 times more, depending on the industry—to attract a new customer than to retain a present one. At the same time, internal efficiency improves, providing additional cost savings. Quality management prevents inefficiencies and the related labor, material, machine, and inventory costs. It also helps a company avoid the costs of delayed payments, reshipment, and repeated service calls. Without question, the quality imperative is healthy for business and industry, consumers and the economy as a whole.

Quality expert Dr. W. Edwards Deming, who introduced quality concepts and processes to the Japanese in 1950 with results that have shaken business and industry worldwide, describes the results of quality achievement as a chain reaction:

Improve Quality—Improve Productivity—Decrease Costs—Decrease Prices—Increase Market Share—Stay in Business—Provide More Jobs—Return of Investment.

Fear, confusion, or excessive optimism are sometimes generated by the prospect of a quality management system or audit. Managers envision loss of decision-making authority, downtime due to excruciatingly thorough inspections, loss of productivity, mountains of paperwork, and huge costs. Workers often fear punitive actions. Conversely, both managers and workers sometimes expect quality management to solve all the company's problems. But quality management is not a cure-all. It can resolve some problems, but it offers no miracle cure. It will do none of the aforementioned things.

Quality auditors are generally not responsible for technical decisions, and quality management auditing is not inspection. While reports are made, paperwork for managers and workers is moderate to minimal. The cost of quality management is relatively small and is normally more than offset by cost savings.

Businesses today are increasingly embracing quality management as a major profit-making strategy. The fact that quality management has become such a prominent strategy in a relatively short time testifies to its extraordinary effectiveness.

As the number of national and international accrediting bodies increases in response to the recognition by business of the importance of quality management, it becomes increasingly more difficult for registrar's to meet the often differing requirements of the various accrediting agencies. This problem becomes particularly acute for registrars seeking accreditation from multiple national and international agencies.

SUMMARY OF THE INVENTION

The present invention provides a methodology that allows registrars to meet requirements of various governmental or quasi-governmental accrediting agencies. The present invention provides a unique set of procedures and work instructions that codify and simplify the process of certifying or registering an organization as conforming to one or more national or international standards. The procedures and work instructions assure strict adherence to the international guidance document that governs registrars—Guide 62, while providing easily used and maintained instructions for new employees as well as seasoned staff. The user-friendly procedures and work instructions are amenable to translation into various foreign languages for use worldwide. In one embodiment, the present invention includes procedures and work instructions governing the quotation process and scheduling of audits (including selection of auditor(s)), as well as audit package review and issuance of appropriate certificates of compliance. The procedures and work instructions for all audits and certifications are preferably controlled and directly auditable via a single location or office, such as the registrar's headquarters, for example.

In one embodiment of the present invention, a method for assuring compliance with governmental or quasi-governmental accrediting agencies includes a quotation process where all quotations are prepared and approved at company headquarters and transmitted to salespeople for delivery to prospective clients. The process includes obtaining client information including at least an industry code, such as a SIC code, which identifies the type of industry, and the requested type of audit, and supplying the information to a central location using a predetermined format or form for use in preparing a formal quotation, preparing a formal quotation based on the client information and a staffing (person-day) requirement corresponding to size of the business requesting an audit, entering quotation information into a central database for tracking existing and prospective clients, reviewing and approving the formal quotation, and forwarding the formal quotation to a salesperson for presentation to the client. The method may also include requesting a deviation from the staffing requirement based on predetermined considerations as well as review and approval of the requested deviation as part of reviewing and approving the formal quotation. Predetermined considerations for staffing deviations may include prior knowledge of the organization system based on registration by the same registrar for a different standard, maturity of the organization's management system, processes performed by the client organization involve a single, general activity, client organization is not responsible for designing products, client has no-risk or low-risk product or process, very small site for number of employees, high percentage of employees doing the same, simple tasks, and preparedness for registration based on previous registration or audit by a third-party, for example. In any event, it is highly unlikely that the total deviation considering all factors would reduce the required auditor time by more than 30% from the established auditor time table.

The present invention also includes a process for scheduling audits, including selection of qualified auditors based on the type of industry using a hierarchical industry classification system. In one embodiment, auditor selection is based on a governmental or quasi-governmental agency classification system, such as the Standard Industrial Classification (SIC) codes established by the United States Department of Commerce to classify industry. Preferably, the hierarchical industry classification system includes a major and minor classification with selection of auditors being based on at least the major classification. Selection of auditors is based on both major and minor classifications for predetermined "high-risk" industries as selected by the registrar. When qualified auditors are unavailable to meet a client's request for a particular industry, the present invention uses a technical/legal expert who meets the qualification requirements to accompany the auditor or auditors throughout the audit. The expert is available to answer questions of a technical or legal nature posed by the auditors. The expert does not communicate directly with the client unless requested to do so by a member of the audit team. In one embodiment, qualifications for technical experts require an individual to have at least 12 months of practical work experience in the industry requiring representation and/or possess sound knowledge of the industry in which the audit is to be performed. In addition, the associated practical work experience must be current, i.e. must have occurred within the last 60 months, for example. Longer periods may be acceptable if continuing technical involvement in the specific technology can be documented. The expert must also have strong working knowledge of the primary language of the audit team and be able to communicate independently with the team members.

A post-audit process according to the present invention provides a procedure which allows auditors to focus on the client's quality system, and the effectiveness of corrective actions taken following the audit. After the audit is complete, the entire audit package is immediately sent to a central location, such as the registrar's headquarters, for a preliminary completeness review, preferably using an associated form or checklist. The audit package is checked for original signatures on documents, that the client's classification is within the registrar's scope of accreditation, that the auditor has signed the appropriate document(s), and that the proper documents are attached for audit evidence, for example. Once the audit package has been thoroughly reviewed, and the client has reported its corrective actions (if any) with accompanying evidence, the completed audit package is forwarded to the registrar's executive committee for final review and approval. If approved, a logistics department issues an appropriate registration certificate, plaque, flag, banner, or the like.

The post-audit process of the present invention provides an efficient system that serves to maintain consistency and high standards for company registration. In addition, the post-audit process prevents auditors from getting bogged down in details and paperwork allowing them to concentrate on their primary task of auditing and evaluating clients' quality systems and corrective actions.

The above features and advantages and other features and advantages of the present invention will be readily apparent to those of ordinary skill in the art based on the following detailed description of the invention and the accompanying drawings.

DETAILED DESCRIPTION OF THE PREFERRED EMBODIMENT(S)

The Meaning of Quality Management

Figure 1:
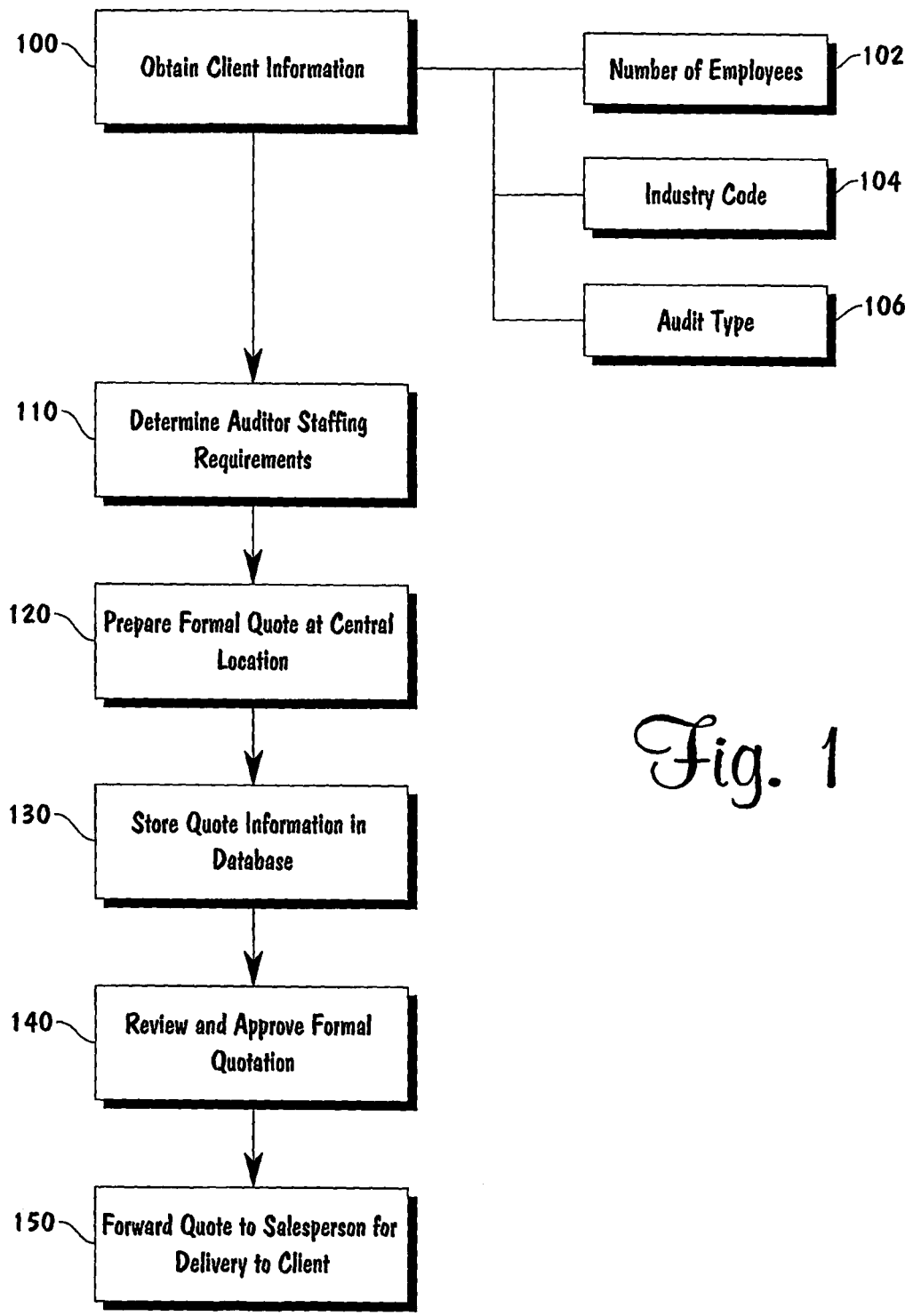
FIG. 1 is a block diagram illustrating one embodiment of a quotation process according to the present invention.

The basis of quality management is to satisfy a given need, according to the customer's requirements. That means the basic concern is to make sure that every element of a company, whether it be processes, procedures, systems, or personnel, is geared to furnish: the right product or service, delivery of the product or service to the right customer, delivery at the right time to the right location, delivery of a product or service that meets requirements, delivery of a product or service that satisfies the customer, provision for the appropriate after-sale service, information needed to answer quality-related questions in the context of producer liability, and delivery of all of the above at the negotiated price.

Quality management is vital to all companies. The quality management system any company establishes depends upon its current and targeted markets and their quality requirements. Companies should use applicable requirements when they implement their quality management system.

For any company, quality improvement begins with four basic action steps. The first step is adopting a definition of quality. This includes conforming to requirements, especially those of the customers. The second step is setting up a system to fulfill this defined quality. This is a prevention system that identifies the chances for mistakes and eliminates them. The third step is establishing performance standards. These must be error-free. Defects and errors are neither inevitable nor acceptable. The fourth step is measuring costs. This means calculating the cost of quality by comparing the cost of non-conformities, incurred from not doing it right the first time, such as scrap, rework and lost customers, to the price of conformity, incurred to ensure things are done right the first time.

The issue of detection vs. prevention is the difference between quality control and the quality assurance approach of a quality management system. The former seeks to detect, while the latter tries to prevent nonconformities. Systems with a focus on quality assurance catch nonconformities as they arise in a process. Ideally, they are easier and less costly to remedy at this point. On the other hand, systems with a focus on quality control will let nonconformities go until the end of the process. Once these problems are detected, they are likely much more difficult and costly to fix.

Quality Standards

Quality standards of various types have been in use for centuries. In medieval times, as craftsmen began to band together to form guilds, they created their own standards by which expertise in their various skills was measured. On the user side, quality standards originated out of military necessity. An English king appointed an officer to oversee the production of naval ships nearly a thousand years ago. At about the same time, another official was put in charge of supervising the quality and effectiveness of land-based weaponry and engineering. In recent times, quality standards have continued to be driven by military necessity. In 1912, the British government created an office to ensure the quality of military aircraft. In the United States, quality standards became paramount during and after World War II with the establishment of the MIL STD series of standards. These continued for decades to be the major quality standards imposed upon suppliers to the U.S. Department of Defense.

Quality standards of a non-military nature have matured in more recent years. In the late 1970s, as quality became imperative for many multinational organizations, it became clear that quality of output was directly related to quality of input. Therefore, major firms which relied heavily on suppliers for subassemblies and components began to create their own proprietary quality standards and mandated them to their supply base.

In Europe, the approach to quality standards has followed a somewhat different course. There, the lead on standards has been taken by government rather than by the private sector. Great Britain, for example, codified BS 5750, a set of national quality system standards, in 1979. This standard was made a requirement for suppliers to the government, especially the military, and the full weight and force of the government were placed upon promoting BS 5750 throughout the private sector. The government actively encouraged firms to register. It created an agency which accredited registration bodies and sanctioned another to authorize trainers and courses. The government also publicized BS 5750 to increase awareness and acceptance of the standard among the population.

The European Union (EU) also adopted a quality systems standard, EN-29000, which resembled BS 5750 in many respects. Both EN-29000 and BS 5750 were models for ISO 9000, which was adopted in 1987, and revised in 1994 and 2000. ISO 9000 is used throughout the EU. In ensuing years, the three standards have been harmonized to the point that they are synonymous.

The International Organization for Standardization (ISO), formed in 1946, is a consortium of 132 national standards bodies. The member body representing the United States is the American National Standards Institute (ANSI). Based in Geneva, Switzerland, the International Organization for Standardization created the ISO 9000 quality management systems standard series, which includes ISO 9001:2000, ISO 9001/9002:1994 and Q9000, the American version. ISO 9000 was developed to simplify the international exchange of goods and services through a common set of universally accepted quality standards. ISO 9000, a descendant of BS 5750 and the U.S. military standard MIL-Q-9858A, is a series of standards on quality assurance and quality management. The standards are not specific to products or services, but apply to the processes which create them. The standards were purposely designed to be generic so that they can be used by any industry anywhere in the world. The series specifies goals, objectives and philosophies, but not procedures.

Since its creation, ISO 9000 has served as the building block for many other standards. Its quality management systems derivatives include the U.S. automotive manufacturers' QS-9000, the international automotive standard ISO/TS 16949, the German automotive standard VDA 6. 1, the international telecommunications standard TL 9000, the international aerospace standard AS9100, the international medical devices standard ISO 13485, and two QS-9000 derivatives: the Tooling and Equipment (TE) Supplement and the Semiconductor Supplement. Other international and national standards which are similarly structured to ISO 9000 include the environmental management systems standard ISO 14001, the calibration and testing laboratories quality management systems and technical competence standard ISO/IEC 17025, the occupational health and safety management systems standard OHSAS 18001, and the U.S. Food and Drug Administration (FDA) Current Good Manufacturing Practices (CGMP) for medical devices.

Quality Plan

The quality plan (ISO 9001:2000, Element 5.4; ISO 9001/9002:1994, Element 4.2.3) is often a contractual document in which the customer specifies that the supplier take certain quality measures in producing the contracted output. The contents of a quality plan, also known as a control plan, may include inspection plans, design milestones, and critical and/or major subcontractors and requirements. Upon customer approval, the quality plan or control plan becomes an integral part of the contract. When creating a quality plan or control plan, the following activities should be considered, if appropriate: identify and acquire the controls, processes, equipment, fixtures, resources and skills needed to meet quality objectives; verify whether designs, processes, procedures for installation, servicing, and inspection and test activities, and any applicable documentation are compatible with the output (product); update methods for quality control and inspection and testing techniques; when necessary, identify any extraordinary measurement requirements; identify verification activities suitable for both the product and the production process; understand and document standards of acceptability to eliminate any subjectivity; and maintain the required quality records to demonstrate the implementation and effectiveness of the quality management system.

The quality plan or control plan may consist of quality documentation, such as procedures and work instructions, specifying general activities and tasks that must be completed. Documentation serves as the foundation of the quality management system. It is essential to ISO 9000, because it provides objective/audit evidence for the system's status. Documentation also plays a critical role for the quality management system auditor, because it is an invaluable reference resource. It explains the company's policies, defines authority, and establishes operational procedures and work instructions to help employees fulfill their job responsibilities.

When it comes to the quality management system, the documentation is structured like a pyramid. This documentation is divided into four tiers as shown in Table 1.

TABLE 1

| Tier | Documentation Example |
|---|---|
| Tier 1 | Quality Policy and Manual(s) |
| Tier 2 | Procedures |
| Tier 3 | Work Instructions |
| Tier 4 | Quality Records |

The Quality Manual (Tier 1)

The quality manual is considered a toplevel document, occupying the top of the quality management system documentation pyramid. It states the company's quality policy and describes the organization's quality management system. Among all of the elements that comprise the ISO 9000 quality management system, none is more important than the quality manual. This controlled circulation document serves a multitude of essential purposes. It is a living, working document meant to be actively used. The quality manual has numerous functions which may include aiding in creating and implementing a quality management system, describing the objectives and structure of the quality management system, demonstrating management's commitment to the system, serving as a cross-reference between the quality management system and ISO 9001:2000, serving as a cross-reference to facility procedures, and serving as a quality management system reference document for auditors and other designated parties, such as registrars, investors and customers, for example. In addition to covering the appropriate sections of ISO 9000, the quality manual can, and usually does, contain a brief statement of the company's commitment to quality, a brief policy statement addressing the company's quality image and reputation, a short company profile aimed at customers and suppliers, a facility mission statement on how the company plans to pursue its quality objectives, a distribution list (controlled circulation), a reference list of facility procedures, and a statement of authority and responsibility.

Procedures (Tier 2)

Procedures are the next level of documentation. They are referred to as Tier 2 documents. A procedure gives information on what activities are conducted in an organization, how they are performed, and who has direct responsibility for them. While the quality manual is a company-wide document, procedures are an extension of the quality manual aimed at different departments. They are activity-based, describing the methods and practices that are used to carry out various quality management system activities that cross functional or organizational lines.

Procedures do not need to be lengthy and redundant. They should be simply written and easy to understand. The ISO 9001:2000 and ISO 9001/9001:1994 standards both state that a facility need only have documented procedures and work instructions. An effective procedure that clearly defines responsibilities will reduce the amount of training needed by new employees. They should be able to perform the task simply by following the procedure.

Work Instructions (Tier 3)

Work instructions fall under the next level of quality documentation, Tier 3. They are directed at the doers of an organization, including the operators carrying out activities in support of the quality management system, and production line workers. While procedures describe an activity, work instructions explain how to do the various tasks specified within a procedure. Work instructions are generally completed by an individual or department. They describe the steps to follow, equipment and resources required for a job, precautionary measures to be taken and other required matters. Work instructions contain specifics, and should be as detailed as necessary to assure clarity and compliance. Since work instructions are "how to" documents, they are likely to change more frequently than the quality manual.

Quality Records (Tier 4)

Quality records are documents that furnish objective/audit evidence that a quality requirement has been fulfilled or demonstrate that the quality management system is operating effectively. These records can be written or stored on any data medium. Records should be kept in a protected place to prevent loss, damage and deterioration. The quality management system should define how long records are to be kept and the disposal method.

Quality Audits

In today's customer-oriented global business environment, improvement measures must be implemented to maintain a competitive edge. Nearly every activity in an organization could benefit from improvement measures, including the processes that monitor the quality of products and services. One effective tool companies can use in their mission of continual improvement is the quality assurance (QA) audit. Since the dawn of the quality age, the term quality audit has come to mean different things to different people.

Objectives of Auditing

Audits have received a bad reputation over the years. The process is often seen by employees and management alike as fuel for retribution or discipline, rather than as an aid which supports error reduction and elimination, compliance, verification, and communication. Audits contribute to achieving many positive objectives. Most importantly: Audits are essential to the process of verifying the performance of a facility's quality management system such that the practice conforms to the applicable standard.

The Audit Team

The Lead Auditor is placed in overall charge of the audit team, which consists of one or more auditors. The audit team should, depending upon circumstances, include experts with specialized backgrounds. The team may include auditor trainees or observers, with the consent of the client, the auditee, and the Lead Auditor.

Nonconformities

According to ISO 9000:2000, 3.6.2 and ISO 8402:1994, 2.10, a nonconformity is nonfulfillment of a (specified) requirement. Nonconformities are classified as either major or minor. Nonconformities may be written as a result of any type of quality audit. When an auditor identifies a nonconformity, he or she must confirm it through objective/audit evidence. Objective/audit evidence is information, such as records or statements of fact about the quality management system, acquired through observation, measurement, test or other means, that can be proven true or are factual in nature.

The ISO 9000:2000 standard, section 3.8.1, defines objective e evidence as: "Data supporting the existence or verity of something." ISO 8402: 1994, 2.19, defines objective evidence as: "Information, which can be proved true, based on facts obtained through observation, measurement, test or other means." ISO 9000:2000, 3.9.4, defines audit evidence as: "Records, statements of fact or other information which are relevant to the audit criteria and verifiable." ISO 10011-1: 1990, 3.7, defines objective evidence as: "Qualitative or quantitative information, records or statements of fact, pertaining to the quality of an item or service or to the existence and implementation of a quality system element, that are based on observation, measurement, or test, and that can be verified."

While the finding of a nonconformity often triggers alarm, this should not happen. Nonconformities are not necessarily bad. They identify weaknesses that may be developed into strengths and point out areas where improvements can be made, leading to continual improvement. Nonconformity causes vary. Major nonconformities can be caused by the lack of a procedure or an inconsistency in implementing the quality system. Major nonconformities can greatly affect product or service quality, put the facility or employees at risk of losing customers, jeopardize industry or government certification, and/or cause great harm to other operations in the company. Some examples of major nonconformities include: no documented procedures for contract or design reviews, internal audit reports of remaining system deficiencies with no evidence of follow-up, a considerable number of inspections, measuring and test equipment without current calibration, and drawing or planning changes carried out informally and unapproved in a number of instances.

Other major nonconformities include a single deficiency in the quality management system, product or service, a lack of quality management system documentation to satisfy requirements, quality management system documentation not being implemented consistently, or a series of minor nonconformities indicating an overall quality management system weakness in an area or activity that collectively have significance. Registration cannot be obtained until corrective action has been taken on all major nonconformities.

The lesser degree of a deficiency, minor nonconformities, are those which do not directly affect product or service quality, or are deemed easily rectified. Some examples of minor nonconformities include: isolated examples of drawings marked up with unauthorized design or tolerance changes, isolated examples of instrumentation out of calibration date, evidence-of corrective action still outstanding on internal audit nonconformity reports, isolated examples of deficient record keeping on contract or design reviews, and insufficient documentation of training experience gained by employees.

Another example of a minor nonconformity includes situations where a defined quality management system, documented procedures, and work instructions exist, there is an acceptable level of implementation overall, but there are minor discrepancies or lapses in following the quality management system requirements or documentation.

There are two other variations of nonconformities which can also occur: the "vital few" and the "trivial many". The "vital few" nonconformities can greatly affect quality, though few in number. They usually represent detriments to safety or economics. These may also be chronic problems detected in earlier audits or specifically mentioned by auditees as ongoing concerns. The "trivial many" nonconformities are often minor and occur in great numbers, typically three or more minor nonconformities against one requirement. These can reflect systemic errors and affect quality due to high volume. When applied against a single requirement, the Trivial Many can constitute a major nonconformity.

Nonconformities are cited when the process does not conform to the quality manual or ISO 9000. Nonconformities typically occur when procedures have not been properly implemented. This causes the process to be ineffective.

Observations are another audit classification. An observation is a weakness in existing conditions that, in the auditor's judgment, warrants clarification or investigation to improve the overall status and effectiveness of the quality management system being audited.

As an example, during the course of the audit, objective/audit evidence was inadequate to clearly determine if the quality management system activity being audited was conforming or nonconforming to specified requirements. Observations may signal the potential for future nonconformities, but do not require a response by the auditee.

Recording Nonconformities

Once a nonconformity is found, it must be recorded on a nonconformity report (NCR). The auditor should make sure that the nonconformity report is accurate, concise and easy to read. In the NCR, auditors must list the audit number or identification, audit date, the area under review, the standard referenced, a report of the nonconformity, based on factual statements, and identification of the responsible auditor and the auditee representative. Upon completion, the NCR has to be signed by both the auditor and the auditee representative. This confirms that the auditee is aware of the nonconformity and agrees that corrective action is needed. It is critical that clear, ongoing communication exists between the audit team and the auditee to ensure that no surprises occur at the closing meeting. After the nonconformance has been acknowledged, the Lead Auditor and the auditee need to agree on a date by which corrective action must be completed, as well as any follow-up measures.

Corrective Action and Follow-Up

After the quality management system audit has been completed and the final audit report has been submitted, decisions on corrective and preventive actions need to be made by the auditee. The auditors are responsible for identifying nonconformities and documenting them with observations backed up by objective/audit evidence. They should also obtain acknowledgment of the nonconformity from the auditee, during the audit itself or at the closing meeting. Auditors may make recommendations, if requested, but only the auditee can create and implement corrective actions.

It is incumbent upon the audit process, whether first-party (internal), second-party or third-party, to follow up on past nonconformities by evaluating the creation, implementation and effectiveness of corrective actions. Only when corrective actions have been implemented and objectively proven to be effective can a nonconformity be considered eliminated. Actions to eliminate the cause of nonconformities can come from market feedback, customer complaints, management reviews, nonconformity reports, and internal and external audits.

Corrective Action

There are several forms of corrective and preventive actions that may be used to address nonconformities. One is a quick fix correction or a short-term corrective action, sometimes implemented on the spot to mitigate further damage until permanent long-term preventive actions can be implemented. Long-term preventive actions are aimed at eliminating the causes of nonconformities and usually involve changes in procedures and systems. They often take some time to implement because complex process changes are involved.

To facilitate adequate follow up, auditees should carefully document the process of implementing and monitoring corrective and preventive actions. Affected employees should be briefed and, if necessary, adequately trained in corrective action measures, especially if they are responsible for monitoring effectiveness. A written statement of corrective action implementation from the responsible area should be secured. The responsible area management should be contacted to determine why the actions were not taken if a written statement is not received by a predetermined deadline. The auditee should document the corrective action process by completing the second part of the nonconformity report form. This includes a description of the corrective action developed by the auditee, preventive action taken to keep the nonconformity from recurring, and auditee signature in both areas.

Follow-Up

Audits are cyclical activities. Prior audit results are used as reference, and often guidance, when developing the scope and plan of subsequent audits. The findings of an initial audit may also trigger another full-scale or mini-audit to confirm that corrective actions to address specific nonconformities have been implemented. To be effective, the initial audit plan might include the requirements and process for conducting follow-up activities to address nonconformities. Findings that might warrant these activities may be outlined by the audit team, then be communicated to and agreed upon by the auditee and client before the initial audit.

Responsibilities of Auditor and Client

The auditor is responsible only for identifying nonconformities. It is the auditee's responsibility to determine and initiate corrective action. Based on the audit findings, particularly the number of systemic problems, or major or vital few nonconformities discovered, it may be necessary to schedule a follow-up audit. This audit may only review nonconformities and corrective actions or may be full-scale. Determining the necessity and extent of a follow-up audit is the decision of the client, which may depend upon a number of factors, which are determined through the course of an audit.

Standards Registrar Registration Process

One aspect of the present invention that contributes to its ability to meet the requirements of various governmental or quasi-governmental accrediting agencies is the centralized control of the registration process. According to the present invention, the registrar preferably guides and controls all aspects of the registration process from a single location, such as the headquarters, for example. The registrar should have procedures as exemplified by the present invention that guide auditors and staff members throughout the registration process. Of course, the registrar's procedures should maintain strict adherence to Guide 62, the IAF document that governs registrars. While adhering to those guidelines, the present invention provides a methodology for codifying and simplifying them to be easily used and maintained both by existing staff and new hires. Further, the procedures according to the present invention are user-friendly enough to be translated into other languages and utilized worldwide. The procedures and work instructions guide the audit quotation process, scheduling audits, and the post-audit review and registration certificate issuance.

Audit Quotation Process

The process of preparing quotations for prospective audit clients is described and illustrated with reference to FIG. 1. To maintain control and consistency, all quotations—regardless of the salesperson's location or territory—are prepared and approved at a central location, such as the registrar's company headquarters, then transmitted back to the salesperson for delivery to the prospective client. The first step 100 is to obtain vital client information such as number of employees 102, type of audit 104, and industry classification code 106. In one embodiment, the industry classification code corresponds to the Standard Industry Classification code developed by the United States Department of Commerce. As known, the SIC codes provide a hierarchical classification system that divides industry into 99 major groups with corresponding major codes numbered from 01 to 99. Within the major groups, industries are further classified into minor codes with two additional digits for a total of four digits. Of course, other industry classification codes may be used depending upon the particular application. The client information is preferably gathered by the salesperson on a paper or electronic form for forwarding to the central location for preparation of the formal quotation. Other client information may include, the number of plant locations, contact information (names, addresses, phone numbers, etc.) business scope, number of shifts, number of production lines, whether the client has been registered to an ISO standard before, and whether the client has additional locations or sites, for example. In addition, client information may include whether the facility conforms to any other quality assurance, legal or regulatory body requirements, whether a quality system manual has been written, whether quality management system document has been distributed, whether records are available for internal audits, and the like.

After receiving the client information at the central location, the administrative staff begins preparation of a formal quotation, which includes determining auditor staffing requirements based on the client information as represented by block 110. In one embodiment, auditor staffing requirements are determined using a table developed by the registrar and indexed by the size of the organization, preferably determined by the number of employees. In a preferred embodiment, auditor person-days are determined based on the number of employees. The person-day grids are based on minimums established in Guide 62, but are less complex and easier to use. The number of audit person-days quoted for the registration process is not at the discretion of the salesperson or the person preparing the formal quotation. Should a salesperson request a deviation from the required number of man-days, a special deviation justification form must be completed, reviewed and approved before the formal quotation is completed. The deviation justification form explains the reason or reasons for the requested deviation in the number of auditor person-days. After completion, the deviation request must be approved by a senior manager or officer, such as the president or audit program manager or designee. If the quote is going out from a regional registrar office, it must also be signed by the local manager.

An audit day reduction justification form documents various reasons for requesting a reduction in the minimum auditor staffing requirements. Preferably, this form includes a site identification, number of employees, and the standard number of auditor person-days (separated into on-site and off-site days). In addition, the proposed adjustments or reductions to the standard number of person-days is provided (for both on-site and off-site where indicated). A justification section details the reasoning supporting the requested deviation. One factor or criterion that may be considered in determining whether a deviation is justified includes prior knowledge of the organization system, i.e. if the system is already registered by the registrar for another standard. The client preparedness for registration as indicated by the client already registered or recognized by a third party may also be considered. Other factors that may be considered include the maturity of the management system, whether the processes involve a single, general activity, if the organization is not responsible for designing products/services, if the client has no-risk or low-risk processes, if a high percentage of employees do the same, simple tasks, or if the client has a small site relative to the number of employees compared to other businesses in a particular industry classification. The sum total of all adjustments made for a given organization considering all factors should not reduce the required auditor time for an initial audit by more than thirty percent (30%) of the staffmg requirement established based on the number of employees.

As also shown in FIG. 1, all formal quotations are preferably generated using a database application accessible via the central location as represented by block 120. The quotation information is stored in the database as represented by block 130, so that all quotation activity for existing and prospective clients can be tracked in the computer system and accessed by others when needed. The central-office database is an essential tool for acquiring new business and providing responsive service to existing clients. The central database is used to check the salesperson and date of last information sett or quote for a particular client. A salesperson preferably has a limited time, such as six (6) months, to close a deal before another salesperson in the same territory is allowed to pursue the same client. However, a quote may be given precedent over an information sheet. If the client company is found in another salesperson's name and it is with the protected period, the salesperson is notified accordingly. If the protection period has lapsed, the profile is updated accordingly if necessary. A salesperson may have an information sheet or quote entered outside of an assigned territory if a crossover form or proof of a referral from a consultant or client is attached. If the client company has not previously been identified, a new record is created and a complete profile is created based on the client information form.

The client information is used to complete a quality quote summary form. This form summarizes the auditor staffing requirements and allocates costs based on the number of person-days, the daily rate, a certification fee, a file maintenance fee and the type of audit, for example. Preferably, the quotation includes complete off-site registration audit activities, such as a review of the organization's quality manual, pre-audit planning, and post-audit write-up. The completed preliminary formal quotation is approved by a proposal supervisor or office manager as represented by block 140 of FIG. 1. Once approved, the formal quotation is forwarded to the salesperson for delivery to the client as represented by block 150.

Auditor Selection and Scheduling

Figure 2:
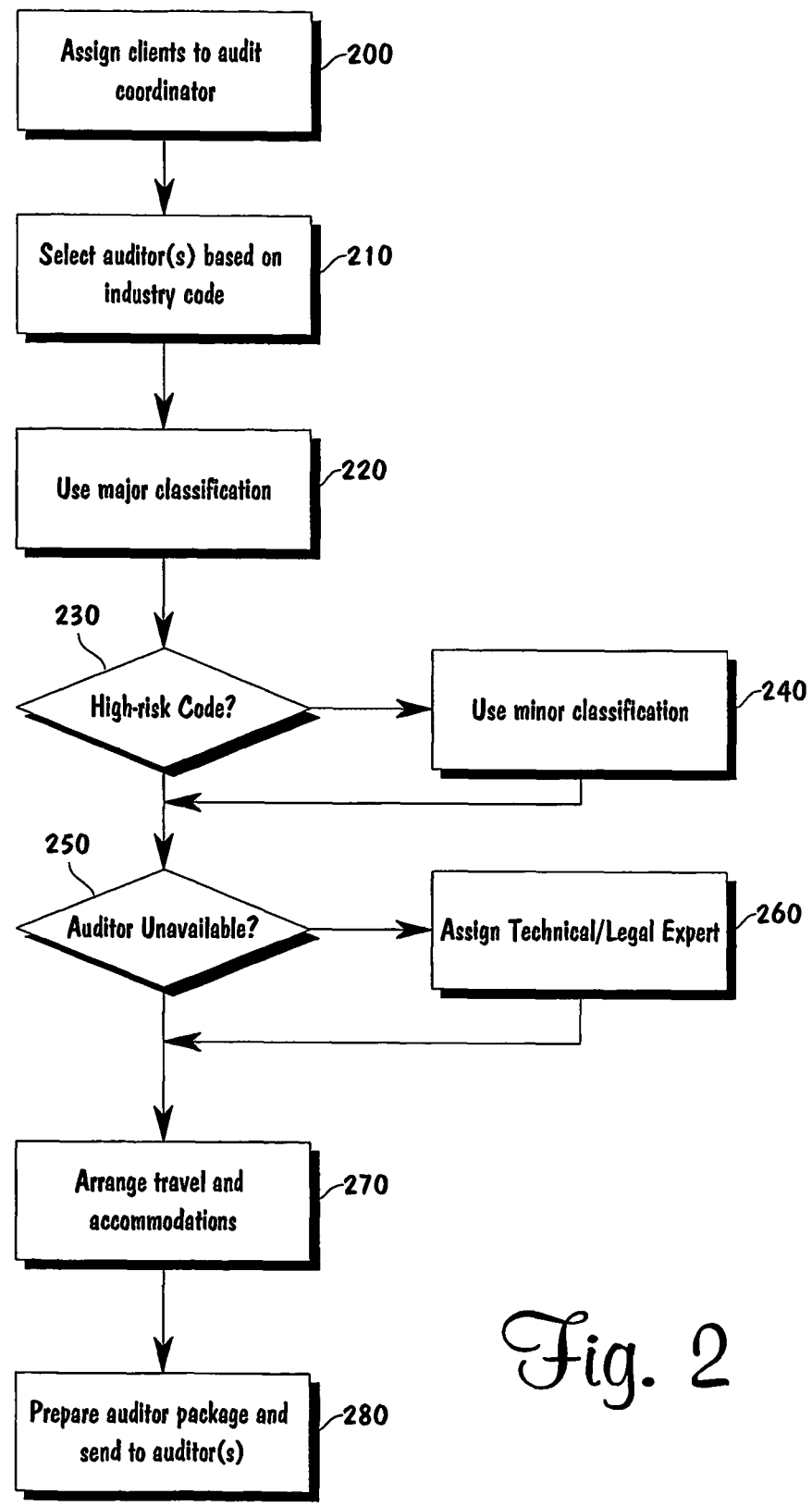
FIG. 2 is a block diagram illustrating a process for scheduling audits and selecting auditors according to one embodiment of the present invention.

If the client authorizes the audit, the actual auditor selection and scheduling is determined as illustrated and described in greater detail with reference to FIG. 2. As with the quotation process, this is a procedure that is preferably handled and controlled at a central location, such as the registrar's headquarters office, for all clients worldwide. The prior art practice of registrars was to make the individual auditors—many of whom may not be actual employees of the registrar—responsible for their own scheduling. To facilitate compliance with various governmental or quasi-governmental accreditation agencies, the registration process of the present invention allows for efficient scheduling of a very high volume of audits. The scheduling process of the present invention has been fine-tuned far beyond the minimum threshold of finding an available auditor, or pair of auditors, to slot in on any given day at any given company. In contrast, specific scheduling processes for various types of audits have been developed including environmental audits, quality system audits, pre-assessments, registration upgrades, surveillance audits, and the like.

The audit schedulers or program coordinators are each assigned a specific group of clients for whom they schedule as represented by block 200. The program coordinators are responsible for a number of tasks in scheduling an audit. Most importantly, the program coordinators are responsible for engaging auditors that are appropriately qualified to audit a particular industry. According to the present invention, auditors are selected based on an industry classification code as represented by block 210. In one preferred embodiment, the auditor qualification process is done using Standard Industrial Classification (SIC) Codes, the U.S. Department of Commerce's system of classifying American industry, which is a hierarchical classification system having major and minor classifications as described above. The auditors are then matched up to clients on the basis of the client's SIC code. Audit team members proposed for the audit must "have the code." The SIC system divides all of American industry into 99 major groups, each designated with two digits—from 01 to 99. Within the major groups, industries are further classified with two additional digits, for a total of four digits. Thus, for example, a company making auto parts would fall under the group designated: 37, Transportation Equipment. Within the 37 group there are approximately 20 sub-industries, for example: 3711, Motor Vehicles & Car Bodies; 3732, Ship Building & Repairing, etc. Companies making auto parts are classified under: 3714, Motor Vehicle Parts & Accessories.

Normally, the proposed auditor(s) for a given client are only required to have the first two digits of the SIC code. However, under the high-risk system according to the present invention, auditors for certain identified industries fall under the "high-risk" designation. In these cases, the scheduled auditor(s) are required to possess either 3 of the 4 digits, or all 4 digits. In addition, for the so-called high-risk audits, auditors are required to use specialized checklists, which include not only all of the requirements of ISO 9000, but in addition, incorporate all additional industry-specific requirements.

One example of a high-risk audit scheduling would be an audit scheduled for a company that makes food or beverage products, which falls under he major group 20, Food & Kindred Products. In such cases, at least one member of the audit team must have 3 digits of the code. In addition, auditors would be required to use the specialized audit checklist for food and beverage companies, which incorporates all of the Hazard Analysis Critical Control Points (HACCP) requirements. The HACCP is the U.S. Food and Drug Administration's (FDA's) preventive program for anticipating and preventing food-borne contamination.

As such, if the industry classification code is a previously identified high-risk code as represented by block 230, the auditor or auditors must be qualified in at least a portion of the minor classification code as represented by block 240, i.e. 3 or 4 digits of the SIC code when that code is utilized.

After identifying potential auditors based on the industry classification, a secondary criterion based on geographic location is applied. Program coordinators attempt to locate the geographically nearest qualified auditor to that client to save clients money on travel costs whenever possible. Particularly with ISO 9000 audits, it is desirable to have enough auditors to locate a properly qualified auditor within 50 miles of the client, thereby eliminating any airfare and hotel costs associated with the audit. Auditor availability is then checked for the desired or required dates for qualified auditors.

The guidance document for registrars—Guide 62—requires that at least one person on the audit team be experienced in the industry being audited. To meet the registration needs of clients in certain highly specialized industries, if a qualified auditor is not available to meet the client requirements (in terms of experience or time frame) as represented by block 250, the present invention uses a qualified expert as represented by block 260. That is, if for whatever reason, a lead auditor qualified for a particular industry is not available within the time frame required for the client's registration audit, a technical/legal expert may be employed.

The technical/legal (T/L) expert must be qualified for the particular industry classification in the same manner that the registrar qualifies all of its auditors. The expert accompanies the audit team throughout the audit, so the expert is available to answer questions of a technical or legal nature. Of course, before being scheduled to accompany any audit team, the expert must sign several agreements, including a client confidentiality agreement and an agreement not to ask questions or communicate directly with the auditee, unless requested to do so by the audit team.

To be considered a technical expert, an individual must possess no less than twelve (12) months practical work experience in the industry requiring representation, and/or possess sound knowledge of the industry in which the audit is to be performed. The associated practical work experience must be relatively recent, i.e. within the last 60 months. Longer periods may be acceptable provided the expert has continuing technical involvement in the specific arena that can be documented. In addition, the expert must have a strong working knowledge of the primary language of the audit and be able to communicate independently with the audit team members. The expert accompanies the audit team throughout the assessment process answering questions and providing advice as needed as an impartial observer.

Once an audit team has been selected (including an expert if necessary) travel arrangements may be determined as represented by block 270. If required, the client is requested to suggest local accommodations and provide directions to the site for the audit. In addition, the client is requested to provide documentation for review prior to the audit. An auditor package is then prepared for the specific type of audit based on the client information and sent to each auditor as represented by block 280.

Audit Package Review/Certificate Issuance

Figure 3:
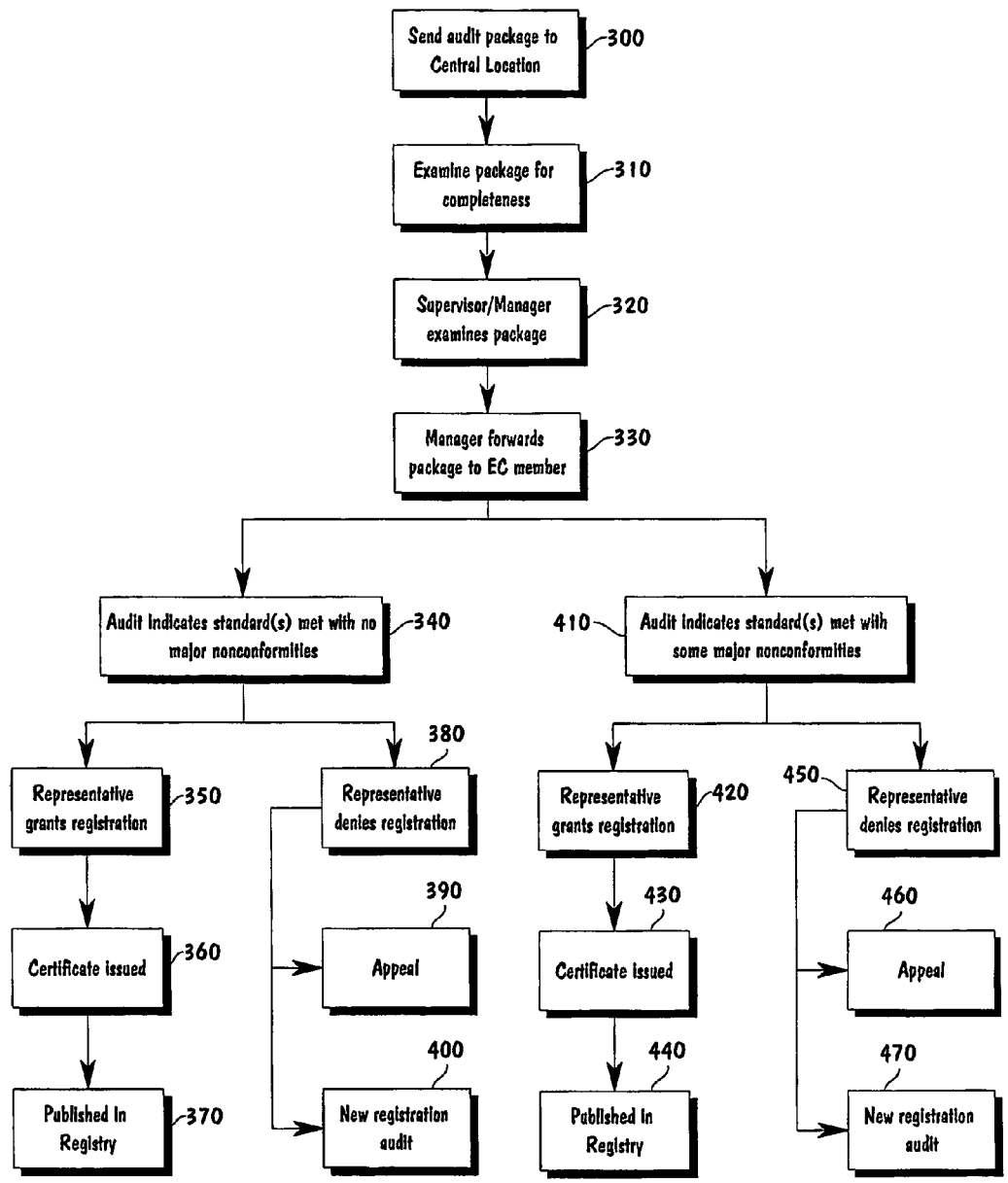
FIG. 3 is a block diagram illustrating a process for audit package review and certificate issuance according to one embodiment of the present invention.

The post-audit process of the present invention allows auditors to focus on the client's quality system, and the effectiveness of corrective actions taken following the audit. After the audit is complete, the entire audit package is immediately sent to a central location, such as the registrar's headquarters as represented by block 300 of FIG. 3. The assistant audit program manager or designee then examines the package for completeness as represented by block 310. This may require holding the package for corrective actions, missing forms, missing signatures, etc., if necessary, and notifing the lead auditor and/or client if necessary. The complete audit package is then given to the audit program manager or designee wo also examines the package for completeness as represented by block 320. This review may include verification of auditor qualifications for the company industry code and the number of auditor person-days expended to complete the audit, for example. Preferably, detailed check lists are provided for each review that allow staff to systematically check the audit package to make sure it meets all requirements. In addition to the checks described above, the package may also be checked to make sure that all documents are originals, that the client's SIC Code falls under the registrar's scope, that the lead auditor has signed the document, that the proper documents are attached for audit evidence, and so forth.

Once the audit package has been thoroughly reviewed, and the client company has turned in its corrective actions with accompanying evidence, the signed audit package is forwarded to the registrar executive committee (or appropriately qualified designee) for final review and approval as represented by block 330. If the audit meets the standard with no major nonconformities as represented by block 340, the registration representatives or designee may grant registration as represented by block 350 with a corresponding certificate issued as represented by block 360 and publication in the registrar's registry as represented by block 370. If the registration representatives or designee denies registration as indicated at block 380, the client may appeal 390 with a new registration audit being requested and/or performed as represented by block 400.

Similarly, if major nonconformities are identified, the audit is outside the accredited scope, or the audit required special training as represented by block 410, the executive committee member or designee has the authority to grant registration 420, issue a corresponding certificate 430 and publish the registration in the registry 440 depending upon the particular situation. However, it is more likely that registration will be denied as represented by block 450. This decision may result in an appeal 460 and/or new registration audit 470. Clients who want or need their certificate, flag and banner sooner than the normal procedure allows can choose to participate in an optional expedited 24-hour registration program for increased cost.

The efficient post-audit system of the present invention not only serves to maintain consistency and high standards for company registration, but also saves the auditors from getting bogged down in details and paperwork—allowing them to concentrate on what they do best, which is auditing and evaluating clients' quality systems and corrective actions.

While preferred embodiments of the present invention has been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An audit quotation system comprising:
one or more computers configured to
receive client information including at least an industry code identifying a type of industry of a product or service provided by a client, a type of quality audit, and a number of employees;
receive auditor staffing requirements information, wherein the auditor staffing requirements information is based on the number of employees;
generate a formal quotation using a computer database application for an audit based on the client information and the auditor staffing requirements information;
store formal quotation information in the computer database application for tracking existing and prospective clients; and
transmit the formal audit quotation to a salesperson for delivery to the client.

2. The system of claim 1 wherein the industry code comprises the Standard Industrial Classification (SIC) code established by the United States Department of Commerce.

3. The system of claim 1 wherein the type of audit is selected from an environmental audit, a quality system audit, a pre-assessment audit, an initial registration audit, a registration upgrade audit, and a surveillance audit.

4. The system of claim 1 wherein the industry code includes a hierarchical classification system having major and minor classifications.

5. The system of claim 4 wherein the one or more computers are further configured to assign auditors based on the industry code.

* * * * *